(12) United States Patent
Chen et al.

(10) Patent No.: US 6,190,922 B1
(45) Date of Patent: *Feb. 20, 2001

(54) SUBSTRATE SUPPORTED LIQUID EXTRACTION

(75) Inventors: Dong Chen, Logan; M. David Shattuck, Providence, both of UT (US)

(73) Assignee: Strategic Diagnostics Inc., Newark, DE (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/061,294

(22) Filed: Apr. 16, 1998

(51) Int. Cl.[7] .................................................. G01N 1/40
(52) U.S. Cl. ..................... 436/178; 210/662; 210/691; 436/125; 436/139
(58) Field of Search ................................. 436/178, 125, 436/139; 210/660, 662, 679, 680, 690, 691, 692, 693

(56) References Cited

U.S. PATENT DOCUMENTS

| | | |
|---|---|---|
| 2,385,471 | 9/1945 | Scharer . |
| 2,593,878 | 4/1952 | Haines et al. . |
| 3,001,917 | 9/1961 | Scheirer . |
| 3,254,210 | 5/1966 | Schmitt . |
| 4,160,802 | 7/1979 | White et al. . |
| 4,186,085 * | 1/1980 | Savage . |
| 4,729,834 * | 3/1988 | Itoh et al. . |
| 4,778,570 | 10/1988 | Von Dam . |
| 4,891,322 | 1/1990 | Blackburn et al. . |
| 4,943,161 | 7/1990 | Michaelis et al. . |
| 4,944,921 | 7/1990 | Colby et al. . |
| 4,960,711 | 10/1990 | Aoki et al. . |
| 4,992,379 | 2/1991 | Hanby . |
| 5,028,543 | 7/1991 | Finch et al. . |
| 5,073,502 | 12/1991 | Steele . |
| 5,391,298 * | 2/1995 | Pieper et al. . |
| 5,427,955 | 6/1995 | Shattuck et al. . |
| 5,536,172 | 7/1996 | Shattuck et al. . |
| 5,882,521 * | 3/1999 | Bouvier et al. . |

OTHER PUBLICATIONS

The Merck Index, Tenth Edition (Windholz et al., ed.), Rahway, NJ: Merck & Co., Inc., p. 687, entry 4649, 1983.*

Josefson et al., Anal. Chem. (1984), 56(4), 764–8.*

L.G. Aravin, et al.; Feasibility of the Determination of some Radiation Chemistry Constants by Nanosecond Flurometry with a Positron Source; 219599q; 1984; Chem. Abstr. 101.

E. A. Braude; Molecular Ultraviolet and Visible Absorption Spectroscopy; 182–183; 1950; J. Chem. Soc.

V.A. Borokova, et al.; Primary Recombination of Pairs Appearing as a Result of Two–quanta Ionization in Different Solvents; 61015s; 1981; Chem. Abstr. 95.

O.V. Butrimovich, et al.; Role of Halomethanes in the Quenching of Fluorescene of Organic Solutions during UV Irradiaiton; 158163k; 1980; Chem, Abstr. 93.

F.A. Carroll et al; Multiplicity of the Reacting State in the Photoaddition of Carbon Tetrachloride to Anthracene; 2046–2047; 1976; J. Chem. Phys.

S.K. Chaudhary et al; Photodechlorination of Polychlorinated Biphenyls in the Presence of Hydrochinone in Dqueous Alkohlic Media; 1113–1131; 1984; Chemosphere vol. 13, No. 10.

De Wiest, A Rapid Actinometric Method for Polynuclear Aromatic Hydrocarbon Photoreaction Studies; 407–409; 1981; Atmos Environ 15(3) Chemical Abstracts, vol. 95, No. 3 issued Jul. 20, 1981.

De Wiest; 23851d; 1981; Chem. Abstr. 95.

M.P. Fogarty, et al; Multicomponent Photochemical Studies by Rapid Scanning Fluroescence Spectroscopy; 438–445; 1980; App. Spectrose.

Lopez–Avila, et al., Microwave–Assisted Extraction of Organic Compounds from Standard Reference Soils and Sediments, 1097–1106, 1994, Analytical Chemistry vol. 66.

Lou, et al, Solvent Extraction–Sequential Injection Without Segmentation and Phase Separation Based on the Wetting Film Formed on a Teflon Tube Wall, 601–606, May 1996, Analyst vol. 121.

Charles A. Lucy, et al., Mechanism of Extraction and Band Broadening in Solvent Extraction–Flow Injection Analysis, 107–114, 1989, Analytical Chemistry vol. 61.

V.A. Lyubimstev et al.; Effect of Photoionization of Complex Molecules in Solution on Spectra and Quantum Yields of Their Fluroescence from Higher Excited Singlet States; 159344f; 1988; Chem. Abstr. 109.

J.M. Masnovi et al.; Electron Transfer from Anthracenes. Comparison of photoionization, charge–transfer excitation and electrochemical oxidation; 2552–2559; 1984; Can J. Chem. 62.

J.K. McVey, et al.; Direct Observation and Characterization of Anthracene Excimer in Solution; 3375–3376; 1976; J. Chem. Phys. 65.

W.C. Meyer; Halogen–Sensitized Photoionization of N,N, N', N'–Tetramethyl–p–phenylenediamine in Liquid Halogenomethanes; 2118–2121; 1970; J. Physical Chemistry, vol. 74, No. 10.

(List continued on next page.)

*Primary Examiner*—Jan Ludlow
(74) *Attorney, Agent, or Firm*—Kilpatrick Stockton, LLP

(57) ABSTRACT

This invention relates generally to a method for the extraction of organic liquid contaminates from a sample. This invention is directed to the ability of hydrophobic extraction material or ribbon tape made of a hydrophobic polymer to facilitate the extraction of liquid organic contaminates from an aqueous sample in contact with an organic non-polar solvent.

10 Claims, No Drawings

OTHER PUBLICATIONS

W.C. Meyer; Halogen–Sensitized Photoionization of Aromatic Amines in Molded Polymer Films; 2122–2126; 1970; J. Physical Chemistry, vol. 74, No. 10.

W.C. Meyer; Correlation of the Luminescense Perturbation of N,N,N', N'–Tetramethyl–p–phenylenediamine with the Path of Halogen–Sensitized Photoionization;; 2127–2132; 1970; J. Physical Chemistry, vol. 74, No. 10.

M. Okamoto et al.; Effect of Pressure on the External Heavy Atom Quenching of Pyrene Fluorescence in Fluid Solution; 5644–5646; 1984; J. Phys. Chem 88.

Okamura, et al., Fluorometric Determination of Chloroform in Drinking Water, 1498–1502, 1982, The Analysis, 170.

R.V. Pole, et al; Photoinduced Electrochromic Effect and its Applications to Displays; 494–497; 1976; Appl. Phys. Lett. 28.

Thomas M. Rossi, et al., Optimization of a Flow Injection Analysis System for Multiple Solvent Extraction, 2056–2061, 1982, Analytical Chemistry vol. 54.

R. Schwartz, et al; The Use of the Suction Wick Technique in Reduced Horizons: Loss of Substances in the Extraction System and Improvements of Methodology; 457–460; 1993; Mitteilungen der Deutschen Bodenkundlichen Gesellschaft, No. 72, I.

N.A. Sadovskii et al.; Quenching of Excimers of Aromatic Compounds by Electron Acceptors; 46660s; 1988; Chem. Abstr. 108.

N. Selvarajan, et al; Solvent Effect on Photochemical Interaction of Excited Anthracene with Carbon Tetrachloride; 23–26; 1979; Ind. J. Chem 18A.

Dennis C. Shelly, et al., Multiple Solvent Extraction System with Flow Injection Technology, 87–90, 1982, Analytical Chemistry vol. 54.

H. Slimamori, et al.; Rates and Efficiencies Of Contact–Ion–Pair Formation in Photolyzed Mixtures of TMPD with Halogenated Compounds in Nonpolar Solvents; 3545–3550, 1993, J of Physical Chemistry, 97 (14).

M.A. Slifkin, et al; Measurement of Ionization Potentials from Contact Charge Transfer Spectra; 949–950; 1967; Nature 215.

J. Stauff et al.; Chemiluminescence of Photoproducts of Polycyclic Aromatic Hydrocarbons and their Carbonyl Compounds; 171596q; 1986; Chem. Abstr. 105.

S. M. Steinberg, et al.; A Review of Applications of Luminescence to Monitoring of Chemical Contaminants in the Environment; 1819–1857; 1994; Chemospere, vol. 28, No. 10.

Stevens, H.M. et al.; The Rapid Screening of Body Tissues for Pentachlorophenol (PCP) with Special Reference to a Poisoning Fatality; 125–129; 1979; J. Forensic Sci. Soc, vol. 19, No. 2 XP 002092154.

T. Stijve et al.; Rapdi Determination of Chlorinated Pesticides, Polychlorinated Biphenyls and a Number of Phosphated Insecticides in Fatty Foods; 131–150; 1974; Mitt. Gebiete Lebensym. Hyg., vol. 65.

S.A. Tucker et al.; Polycyclic Aromatic Hydrocarbon Solute Probes. Part VI: Effect of Dissolved Oxygen and Halogenated Solvents on the Emission Spectra of Select Probe Molecules; 269–273; 1990; Appl. Spectrose 44.

G. Vermeersh, et al; Chemically Induced Nuclear Polarization Study of the Photochemical Reaction of Anthracene with Tetrahalomethanes; p. 546, column 2, abstract No. 54180k; 1493–9; 1979; Chem. Abstr. 90 No. 7.

W.M. Wiczk et al.; Photophysical and Photochemical Studies of Polycyclic Aromatic Hydrocarbons in Solutions containing Tetrachloromethane I. Fluroescence Quenching of Anthracene by Tetrachloromethane and its Complexes with Benzene, p–Xylene and Mesitylene; 761–766; 1986; Z. Naturfosch 41a.

W.M. Wiczk et al; Photophysical and Photochemical Studies of Polycyclic Aromatic Hydrocarbons in Solutions Containing Tetrachloromethane II. The Solvent Effect on the Fluorescence Quenching of Aromatic Hydrocarbons by Tetrachloromethane; 1290–1295; 1987; Z. Naturforsch. 42a.

M.W. Wiczk et al.; 259–264; 1991; Z. Naturforsch 46a.

Wilson; Zero–Valent Metals Provide Possible Solution to Groundwater Problems; 19–22; 1995; C&EN.

R.B. Zhutkovskii, et al.; Tunnel Effect in Electron Phototransfer from Naphthalene and Diphenylamine to Carbon Tetrachloride in Alcohol Matrixes;151039x; 1974; Chem. Abstr. 80.

* cited by examiner

SUBSTRATE SUPPORTED LIQUID EXTRACTION

BACKGROUND

1. The Field of the Invention

This invention relates generally to a method for the extraction of organic liquid contaminates from an aqueous sample. This invention is directed to the surprising ability of hydrophobic sheet or ribbon tape made of a hydrophobic polymer to facilitate the extraction of liquid organic contaminates from an aqueous sample. This invention further provides a method which facilitates the analysis of hazardous or toxic waste sites in the field, i.e. outside a laboratory environment.

2. The Background Art

In general, historical methods for the extraction of organic contaminates from an aqueous sample involved the addition of a suitable amount of a non-polar organic solvent such as methylene chloride or octane to the aqueous sample from which contaminates were to be extracted. Because the added organic solvent is non-polar and water is polar the two liquids are immiscible. This opposition in polarity and inherent immiscibility causes the two liquid systems to separate into two layers, much like the separation of oil and water into two layers. A typical separation would place both liquid phases in a separatory funnel which allows for the separation of the two phases by selectively removing one layer. The two phases are shaken or vigorously stirred together to provide sufficient contact between the two phases. The contact between the two phases allows the components of the mixture to migrate into the phase which resembles the contaminate's polarity. Because most contaminates of interest are non-polar, the non-polar organic phase tends to extract the contaminates from the polar aqueous phase into the organic phase. The organic phase including the contaminates can then be separated from the water phase. Once the organic phase is separated from the aqueous phase and had all water removed therefrom it is analyzed for contaminate content. Frequently this analysis has as its goal the determination of the presence or absence of a specific organic contaminate, such as the presence of polyaromatic hydrocarbons or polychloro phenols. Moreover, these organic contaminates may be present in only minor amounts when compared to the volume of the sample to be tested. Because the organic contaminate is present in only minor amounts, it is frequently desirable to concentrate the sample many hundred-fold to facilitate the observation of the contaminate. Indeed where the contaminate is present in parts per million (ppm) or parts per billion(ppb) it would likely remain undetected unless the contaminate concentration were increased.

The process of concentration often involves an evaporative process. This process involves heating of the sample whereby the majority of the solvents are driven off, leaving the contaminates in the evaporative reservoir. However, this process relies on the contaminate having both a higher boiling point and a lower vapor pressure than the organic solvent used to effectuate the contaminate's extraction. If the contaminate has a higher boiling point than the solvent, the evaporative process results in the evaporation of the solvent, resulting in a concentrated mixture containing the contaminates. But where the contaminate has a lower boiling point than the solvent, the contaminate will evaporate with the solvent and be discarded, thus destroying the reliability of the extraction. Additional concerns exist where the extraction solvent forms a binary or tertiary vapor state complex with one or more of the contaminates. When such a vapor phase interaction occurs, the involved contaminates co-distill with the solvent, even where the compounds involved have different vapor pressures and boiling points. The co-distillation would result in one or more contaminates being distilled with and disposed with the solvent. Such an interaction would likewise defeat the goal of the extraction and concentration procedure because unknown contaminates would be lost or disposed of prior to detection providing a false negative regarding the presence of the contaminate in the sample.

Accordingly, the process of concentration through evaporation is fraught with difficulties and concerns. These concerns are more prominent in the area of waste analysis where the goal is the elucidation of contaminates within an aqueous sample. Often in such samples, the contaminates and corresponding concentrations within the sample are unknown. Therefore, any method of analysis which increases the potential for loss of a contaminate renders the result of the analysis questionable. In order to circumvent these concerns, methods of extraction and analysis have been developed which are able to extract very small quantities of contaminates from within a sample.

One method of extraction which has been investigated involves the injection of a sample containing an unknown into a liquid chromatography column (LC). The LC facilitates the extraction of the organic unknowns from the aqueous sample. The LC further allows for the separation of the organic unknowns into individual compounds for individual analysis. The LC requires, however, substantial amounts of organic solvents, increasing the quantity of organic waste. The LC also causes an increase in the dilution of the organic contaminates after extraction and requires bulky instrumentation. Moreover, LC extraction is a time intensive process not suited for the rapid extraction of organic contaminates from an aqueous sample. Neither can the LC method be used outside of a laboratory setting at a field site for the extraction of contaminates from waste at a site.

It has been proposed that an efficient extraction technique would maximize the extraction of contaminates from an aqueous sample and minimize the organic solvent waste produced by the extraction. One intensely investigated field, solvent extraction-flow injection, involves the careful formation of a wetting film on the interior surface of a capillary tube with an hydrophobic organic solvent. Solvent extraction-flow injection (SE-FI) has become an essential analytical tool for a direct method of analysis or as a separation and pre-concentration step for further analysis of unknown samples. The SE-FI method is a form of liquid-liquid extraction where the contaminates within the aqueous phase are washed out or extracted from the aqueous phase through the interaction of an organic solvent. However, the SE-FI system allows for LC type extraction but with the use of less solvent.

Classical SE-FI involves the following operations: (1) segmentation with an immiscible organic solvent, (2) equilibration in an extraction coil, and (3) separation of the organic phase from the aqueous phase for determination. The most critical aspects of the conventional SE-FI system are the segmentation and phase separation, with respect to their influences on the reproducibility, reliability, stability and overall dispersion of the sample zone. These processes have been extensively studied and many refinements of segmentation and phase separation of solvent extraction in flow systems have been made. The SE-FI method relies on the formation of discrete segments of liquid corresponding to the aqueous and organic portions of the sample within a small diameter tube. The extraction mechanism of the SE-FI systems to date is basically the same as that of batch LC separation procedures. Two immiscible phases are brought together and mixed with each other causing the extraction of the contaminate from the aqueous system into the organic phase and an analysis of the contaminates is then made with or without phase separation. However, the SE-FI method relies on the same LC type liquid-liquid extraction to separate the contaminates from the aqueous sample. The tubing serves only as a support for the segments where the extraction which occurs between the segments is determined by the two liquids used to facilitate the extraction, not the chemical make-up of the tubing.

Contrasted to the SE-FI method, in a segmented flow system the reproducibility and reliability of the results depend on the repeatability of flow rates and segmenter and/or the quality of the phase separator. This type of extraction system requires the continuous formation of organic and aqueous phase segments within the extraction tube. Each aqueous segment is extracted by the preceding and following organic phases. This technique provides for twice the extraction power of a classical SE-FI system, but with more waste produced. Because the aqueous and organic phases must be flowing continuously during the whole process, the consumption of organic solvents and other chemicals is relatively high which produces more laboratory waste and precludes such methods for field use. Further, the concentration factors of these systems are generally small (<20) because the ratio of the flow rates of the aqueous phase containing the contaminates and the organic phase cannot be increased indefinitely.

The film-forming characteristics of organic solvents on Teflon™ tubing walls have been used to produce another SE-FI/sequential injection system. The organic solvent, aqueous sample solution and eluting solution are sequentially aspirated into the extraction coil. The extractable contaminates in the aqueous solution were extracted into the organic wetting film formed on the wall of the extraction coil and then eluted by microliter volumes of an eluting solution; concentration factors as high as 150 can be achieved. The need for a segmenter and a phase separator are eliminated and both the consumption of organic solvents and the laboratory wastes are reduced. However, it is still essential that the organic film be maintained on the tube wall for extraction of the organic contaminates to occur. Regardless of method and procedure of use, the extraction is accomplished through the liquid-liquid phase interaction between the polar and non-polar phases. It is the energetic motivation for the non-polar contaminates to migrate out of the polar phase, into the non-polar phase which accomplishes the extraction. Indeed the surface area of the liquid-liquid interface is of crucial importance because extraction can only occur at the polar/non-polar boundary. The greater the area of polar/non-polar boundary interaction the more efficient the migration of contaminates from the polar to the non-polar layer.

In two immiscible phase liquid flows such as are found in an SE-FI extraction coil the solvent displaying a greater affinity to the tubing material will cover the tubing inner walls with a very thin film of relatively stationary nature. In hydrophobic tubing such as Teflon™ or other non-polar polymers, the organic solvent acts as the film-forming phase, and the aqueous segments will be surrounded by the film of organic solvent. The driving force for the film formation is the minimization of the interfacial energy at the solid/liquid interface, which is determined by the relative magnitudes of the surface tension of the inner tubing wall surface in contact with the liquids and the interfacial tension of the liquids. There is no exact theory for the film formation in SE-FI systems but many agree the film is formed to minimize polar/non-polar interactions between the tubing wall and the aqueous phase.

The formation of the wetting film increases the mass transfer speed and extraction efficiency because there are two basically different transport mechanisms in the extraction coil: transport through the vertical interfaces between the two phases (axial extraction) and transport through the wetting film on the tubing wall (radial extraction). However, the existence of the wetting film, which bridges the adjacent segments of organic solvent, allows transport of the extractable components from one organic segment to subsequent organic segments. Hence the presence of the film results in peak dispersion within the extraction coil. The thicker the film, the greater is the peak broadening. Therefore, in classical SE-FI, the prevailing philosophy is to minimize the band broadening by using organic solvents that yield thin wetting films. Unfortunately this technique also limits the interacting surface area of the non-polar film with the contaminate containing polar phase. Moreover, peak broadening can be further minimized through the increased formation of alternating polar non-polar segments along the inner wall thereby precluding the migration of organic contaminates between non-polar segments. This technique, however, further diminishes the surface area of polar/non-polar interaction, decreasing extraction efficiency.

The linear velocities in SE-FI and flow systems are generally low, and the prevailing flow pattern is laminar. The flow velocity near the tubing wall is zero, whereas it is twice the mean flow velocity in the center of the tubing. This severe discrepancy in flow adversely affects the extraction of contaminates from the center of the aqueous flow into the organic phase at the wall. Because the film on the inner wall is very thin, it forms part of a relatively stationary phase along the tubing wall and can only cause the desired extraction of contaminates where the contaminate contacts the organic phase. Because of the discrepancy in the flow velocities between the polar and non-polar phases, the extraction dynamics are adversely affected, decreasing the efficiency of extraction. The extractable components in the flowing aqueous solution can be extracted into the organic wetting film when they enter the diffusion zone of the two phases. The diffusion zone is the interface or point of contact between the two phases. Solutes in the central part of the aqueous flow will diffuse to the diffusion zone and be extracted by the subsequent section of the film. This type of extraction system requires a certain contact time for the extractable components in the aqueous flow to be extracted into the organic wetting film. The required period of time is determined by the contaminates contained within the sample. Where the contaminates are unknown, the required period of time is also unknown and may demand a prolonged contact period to ensure proper extraction. Additionally, the organic wetting film remains adhered to the inner portion of the tubing wall and requires an additional extraction step to remove the extracted contaminates from the wetting film.

Three approaches can be used to elute (wash out) the extracted components: (i) elution with another section of the same organic solvent forming the wetting film: (ii) elution with another organic solvent that can wash out both the extracted components and the wetting film; and (iii) back-extraction of the extracted components. The last two methods are more efficient than the first because the first method uses a new portion of the wall coating solvent to replace the wetting film on the tubing wall and there is a distribution equilibrium of the extracted components between the eluting solvent and the wetting film, which results in a loss of the extracted contaminates. Because the thickness of the film is of the order of a few tens of micrometers, back-extraction is fast and efficient. However, because the wetting film is so thin, the surface area of interaction between the two phases is also at a minimum, limiting the efficiency and speed of the extraction.

In a conventional SE-FI system, the extraction efficiency is influenced by the tubing length, inner diameter and geometry. It is assumed that all of these factors have some effects on the extraction efficiency of any proposed system. Further, the wetting film is the only organic phase available for the extraction of contaminates in the system. The volume of the organic film is much less than that of the segmented polar system. Therefore, the most critical aspect of these system is the extraction capacity and surface area of the wetting film. The geometry of the extraction tubing also has some effects on the extraction efficiency. However, regardless of coil shape, all extraction methods involve a tubular extraction geometry with the included problems associated with tubular systems. Furthermore all known systems require a sophisticated injection/segmentation system to allow for the creation of a stationary wetting film into which the contaminates will be extracted. Moreover all methods of the prior art require that the extracted contaminates be "washed" out of the extraction tube, often requiring substantial additional solvent. The increase in solvent output requires the use of an evaporative concentrator, thereby incurring the problems associated with such concentrators.

These and similar extraction methods require substantial hardware and technical expertise which preclude their use in a field extraction of contaminates. It would therefore be useful to have an extraction system which required only a minimum of laboratory paraphernalia. Furthermore it would be useful to have an extraction method which made use of a hydrophobic polymer which was not limited by tubular shape, thus providing increased efficiency and increased surface area of interaction because of the new shape

BRIEF SUMMARY AND OBJECTS OF THE INVENTION

In view of the above described state of the art, the present invention seeks to realize the following objects and advantages.

It is therefore an object of the present invention to extract organic contaminates from an aqueous environment through the use of components which are easily taken from the lab and into the field for "field testing" of potentially contaminated sites.

It is an additional object of the present invention to extract organic contaminates from an aqueous environment onto a sheet which has been immersed in the aqueous environment.

It is a further object of the present invention to cause the organic contaminates of an aqueous sample to associate with an hydrophobic sheet whereby the contaminates are extracted from said aqueous environment.

These and other objects and advantages of the invention will become more fully apparent from the description and claims which follow, or may be learned by the practice of the invention.

This invention relates to the use of a segment of polytetrafluoroethylene sheet which facilitates the extraction of organic contaminates from an aqueous sample. The extraction spoken of herein is somewhat different from the usage of the same term in the prior art. As used herein, the term extraction will be used to mean the removal of a representative portion of the contaminates from an aqueous sample. Furthermore, as used herein, the term extraction will also mean that a representative sampling of the organic contaminates within the aqueous sample are removed for further analysis. The term "extraction" will generally not include the separation of the organic contaminates into discreet components. Rather, as used herein, extraction is the removal of a representative cross section of organic contaminates from the aqueous sample.

This extraction or removal in accordance with the present invention is caused by the hydrophobic/hydrophilic interaction within the aqueous sample. Specifically, within the aqueous sample hydrophobic/hydrophilic interactions are present. Hydrophilic interactions exist between the water molecules and other polar molecules within the sample. Whereas hydrophobic interactions exist between non-polar molecules within the aqueous sample. Polar molecules will prefer other polar molecules, to the exclusion of the non-polar molecules. An identical, corresponding phenomenon will cause the grouping of the non-polar molecules. This natural polar/non-polar segregation causes the formation of micelles or pockets of non-polar concentration within the larger polar aqueous environment.

Because polytetrafluoroethylene is non-polar, when the non-polar sheet is inserted into the sample the non-polar molecules are attracted to it. Although this attraction is enhanced by the polar aqueous environment of the sample to be extracted, the non-polar contaminants are also naturally attracted to the non-polar sheet. The attraction of the non-polar contaminates onto the sheet results in the formation of a film of non-polar contaminates on the surface of the sheet. The film is formed on the sheet in preference to the formation of micelles in the polar aqueous sample.

Although the scope of this invention is not limited to the correctness of any scientific explanation relative to why this invention accomplishes its unexpected results, the observed preference for the non-polar contaminates to adhere to the sheet is likely caused by the energetics involved in the interactions of non-polar and polar substances in a polar environment.

In a polar liquid environment substantial stability is accomplished through hydrogen bonding. Hydrogen bonding can be explained to be where a portion of a molecule with at least a partial positively charged portion is attracted to another molecule with a portion which is at least partially negatively charged. This interaction between opposite charges or poles is often called an ionic attraction. These ionic or polar attractions/interactions are substantial enough to be one reason for the higher boiling point of water as compared to the lower boiling point of non polar liquids of a similar molecular weight. The strength of these polar interactions is as well one reason for the formation of micelles when a non-polar liquid is introduced into a polar liquid, such as oil in water for example.

It is well known that oil and water do not mix. However it is less well known but equally true that a small amount of oil can be suspended in water. Although this suspension is not the result of the oil becoming dissolved in the water, it is the result of the formation of small micelles of oil within the water. These micelles are small enough so as to be suspended within the water as individual pockets of oil. The micelles are suspended in the water because of the various flow currents, such as brownian motion and other thermally based molecular movements. The polar hydrogen bonding between the water molecules forces the oil to shape itself such that it presents the smallest surface area to the polar environment in which it exists, and from which it wishes to separate. Without further interactions to cause otherwise, the micelles will adopt a substantially spherical shape because a sphere presents the lowest outer surface area as compared to other shapes. Moreover, the spherical shape is energetically favored because the oil must maximize favorable non-polar interaction and minimize unfavored non-polar/polar interactions. The sphere shape facilitates these interactions by creating an inner area of exclusive non-polar interaction and a minimum external surface area of non-polar/polar interactions.

The external interactions could also be diminished through the non-polar/non-polar association of the non-polar substance to a solid non-polar surface. This interaction would allow the non-polar liquid a favorable interaction with the non-polar surface and a minimum external interaction with the polar liquid. This type of favorable surface interaction is a possible reason for the functioning of the present invention.

EXAMPLES AND DESCRIPTION OF THE PREFERRED EMBODIMENTS

Accordingly it has been discovered that a segment of a non-polar sheet when inserted into a sample containing organic contaminates causes the adhesion of the non-polar contaminates to the surface of the sheet. This surprising result provides substantial benefit, solving many concerns and problems relating to methods known previous to the present invention.

One main goal of field testing is to minimize additional creation of organic waste. The present invention accomplishes this through the use of a non-polar sheet to extract the contaminates whereas previous methods depended on a liquid-liquid solvent extraction paradigm. As discussed previously, a liquid-liquid extraction procedure involves the "washing" of the aqueous sample with multiple aliquots of an organic solvent. Obviously, even where the volume of the washing organic solvent are held to a minimum, the final volume of the extracted contaminate containing solution has increased. Indeed, this type of extraction often increases the final volume of organic waste by several hundred fold.

Whereas in the practice of the present invention a small amount of additional organic solvent is added in order to accomplish the extraction. The non-polar extraction material is inserted in the aqueous sample to be extracted. The sample plus extraction material are agitatedly mixed for a period of time sufficient to allow the contaminates within the sample to contact and adhere to the extraction material. The extraction material is compressed against a surface of a second, clean, storage container to remove the extracts from the extraction material. The extraction material is removed from the sample by conventional means such as tweezers or the like. The practice of the present invention therefore provides an extraction of a representative cross section of the sample by a minimal increase in the volume of organic waste.

Field testing of potentially contaminated sites often creates a logistical problem because the distance from the analysis laboratory and the site to be tested. Where the site to be tested is near the analysis facility the concerns are minimized because travel time is not a barrier to multiple sample analysis. However, where the distance to the contaminated site is great it would be advantageous to transport the required machinery to the site to be tested. Because of the size and weight of the apparatus used in previously known methods of extraction and analysis this has not been possible, or at least has been time and cost prohibitive.

Whereas in the present invention the required paraphernalia are at a minimum and more easily transported. The non-polar extraction material as a sheet or tape or other planar configuration can be easily stored on a roll for compact storage of large quantities requiring minimum space. Alternatively, other configurations for the non-polar extraction material can also be used within the scope of the present invention. Because the amount of additional organic solvent needed is minimized, the volume of solvent which must be transported to the testing site is as well minimized, further facilitating travel to the testing site.

Moreover because the present invention does not require liquid-liquid extraction as previously performed, none of the glassware normally required for liquid-liquid extractions is needed. This diminished need for the extraction glassware further facilitates the practicing of the present invention in the field.

The evaporative concentration step of extraction methods discussed previously is also circumvented by the present invention. As previously discussed, some technique must be employed to remove the organic extraction solvents of previous methods, leaving a concentrated sample. However, care must be taken to prevent the loss of volatile or azeotropically complexed portions of the sample. Whereas in the present invention no evaporative concentrating step is necessary. The non-polar extraction material will cause the extraction of volatile and non-volatile organic contaminates without risk of loss. Indeed, because the present invention does not require an evaporative concentration step there is no risk of loss due to evaporation secondary to solvent evaporative temperature and pressure or a solvent-azeotropic complex induced evaporation. Therefore the present invention provides results which are more reliable because of the reduced risk of loss due to evaporation.

Although a preferred embodiment of the present invention utilizes a thin rectangular tape-like shape, the extraction material of the present invention can be of any shape and thickness. Indeed this invention envisions the use of three dimensional amorphous semi-solids as well as a shape defined solid of thin rectangular configuration. The main functional characteristic limitation of the extraction material selected is the requirement for non-polarity and a surface energy such that a non-polar solvent such as octane forms an energetically favored film on the surface of said material.

The use of a ribbon or sheet type embodiment of the extraction material presents a surface area benefit over the use of a tubing type configuration. The terms "ribbon" and "sheet" are used herein to denote a substantially flat geometric structure. Although many geometric shapes are envisioned by this invention such as circle, square, triangle oval and so on, the shape selected is less important to the functioning of the invention than is the non-polar material of which the sheet is constructed. Moreover, as will be explained shortly, because the interacting surface area of the sheet is more important than the shape, it is preferred that the sheet take on a more elongated rectangular shape. One example of this type of geometric shape is demonstrated by standard pressure sensitive adhesive tape or standard plumber's tape as known in the art. Although the tape of the present invention can be many meters in length, it would also present a more rectangular shape. This type of rectangle would have lengthy sides with a width and thickness of a smaller dimension. With a sheet configured in such a manner, regardless of whether the corners of the rectangle are rounded more approximating an oval or circle, the sheet would function similarly to a rectangle of the same surface area and chemical composition. Furthermore, even where the extraction material is a semi-solid or gel of undefined shape, it will be of a non-polar polymeric material to which contaminates of the sample will adhere.

This extraction material in a sheet or tape configuration would interact with the sample to be extracted on at least two surfaces. Whereas a tubular configuration could only interact with the sample to be extracted along the inner surface. Although the dimensions of the extraction material may be of diverse dimensions for the purposes of contrast and comparison a tape type configuration is used. For example, in an extraction material in a sheet or tape embodiment according to the present invention with a width of 10 mm, a length of 10 M and assuming a small thickness, would provide an effective surface area of 0.1 $M^2$ on each of two sides to provide a total surface area of 0.2 $M^2$ for the tape. Whereas a tube having an interior circumference of 10 mm and a length of 10 M presents an interior surface area of c·l which is (0.01M)10M after substitution. The result of this calculation provides an interior surface area of 0.1 $M^2$ which is ½ the surface area of an extraction material according to the present invention. Although the shape and dimensions of the extraction material actually used may differ from that of the previous analysis, the advantageously superior surface area of the extraction material will remain. However, the simple difference in surface area is not the sole difference between the present invention and the tube shaped devices used for extractions of the prior art.

The present invention shall be further explained through two general examples which should be seen as general embodiments of this invention, not limitations thereto.

GENERAL EXAMPLE I

To a liquid sample which is a mixture of water and one or more organic contaminates to be extracted is added a minimum of an organic non polar solvent, such as octane. Immersed in this liquid sample is a portion of extraction material formed from a non-polar polymer such as polytetrafluoroethylene. The sample and extraction material are shaken or stirred vigorously for about 10 minutes. The method and manner of stirring or agitating are less important than the caused interaction of the contaminates with the added non-polar solvent and extraction material. The extraction material is then removed from the first sample containing container and placed in a second, clean container. The extraction material is mechanically compressed against a surface of the second container causing the extracted contaminates to flow from the extraction material. The extraction material is removed from the second container and cleaned for reuse or perhaps discarded. The second container now holds a concentrated sample of the organic non-polar contaminates from the original sample. This second solution can be dried, i.e. have the water removed such as through the addition of sodium sulphate, and tested for the presence of organic substances of environmental concern, such as polychlorinated biphenyls, according to methods known in the art. This process causes a concentration of the contaminates of the original sample in the second container, sometimes concentrated many hundred fold as compared to the concentration of the contaminates within the original sample.

Importantly, the addition of the small amount of non-polar organic solvent prior to the insertion of the extraction material is preferred. Although the addition of a small amount of non-polar solvent is preferred, such a preferred use is not a limitation of the invention but rather describes a best mode for practicing this invention.

GENERAL EXAMPLE II

Alternatively where the sample to be extracted is a solid sample, a portion of water and an organic solvent such as octane are added to the sample prior to the insertion of the extraction material. Subsequent to the addition of the fluids, all steps and procedures are similar to those explained in General Example I.

The addition of a quantity of non-polar solvent to the solid to be extracted facilitates the rapid extraction of the sample. However it will be understood by those of ordinary skill in the art that the desired extraction of the solid sample reasonably occurs in the absence of the additional solvent. Indeed, the desired extraction does not depend exclusively on the additional non-polar solvent. But rather, the additional solvent facilitates the desired extraction in a consistent manner in a reasonable amount of time. Furthermore it is intended that these and other examples describe preferred embodiments of this invention which is limited in scope only by the associated claims.

EXAMPLE 1

A 30 inch length of Teflon (polytetrafluoroethylene) tape as the extraction material and 1.0 ml octane were added to 1000 ml water contaminated with a spike of 10 $\mu$g/L trichloroethylene (TCE). The contaminated water contained in a 1 liter glass bottle, was shaken for 4 minutes. The Teflon extraction material/octane/TCE was then removed from the water and transferred to a 3.7 ml glass vial. The octane/TCE was separated from the Teflon extraction material with a pipette tip pressed against the extraction material at the bottom of the vial. The diluted octane/TCE solution was injected into a gas chromatograph (GC) for quantitative TCE determination. The diluted octane/TCE (5×) solution was found to contain 600 $\mu$g/L TCE or an undiluted octane solution of 3,000 $\mu$g/L (5×600) with a concentration factor of 300. This example demonstrates the ability of this method to extract an organic contaminant from an aqueous sample in a minimum of time with a minimum of either hardware such as an injector or separator and a minimum of organic solvent waste while providing exceptional extraction and concentration of the organic contaminates. Moreover, this example demonstrates the ability of the present invention to effectuate an extraction and concentration without an evaporative type concentration step.

EXAMPLE 2

A 30 inch length of Teflon tape and 1.0 ml octane were added to 1,000 ml water spiked with 50 $\mu$g/L TCE. The contaminated water contained in a 1 liter glass bottle was shaken for 4 minutes. The Teflon tape/octane/TCE was removed and placed in a small glass vial. The octane/TCE was then separated from the Teflon tape. A 0.3 ml octane/TCE aliquot was pipetted to 1.2 ml octane contained in a small glass vial. The diluted extract was mixed and a portion injected into a GC for quantitative TCE determination. The diluted (5×) octane/TCE solution was found to contain 3600 $\mu$g/L TCE. The undiluted octane solution was calculated to contain 18,000 $\mu$g/L TCE (5×3,600) with a concentration factor of 360.

This example demonstrates the ability of this method to extract an organic contaminant from an aqueous sample in a minimum of time with a minimum of either hardware such as an injector or separator and a minimum of organic solvent waste while providing exceptional extraction and concentration of the organic contaminates.

EXAMPLE 3

The extraction of semivolatile contaminates from aqueous systems presents a problem for systems which require evaporative concentration prior to analysis because of loss of the contaminate. This example demonstrates how Teflon substrate extraction of the present invention is useful on the extraction of a semivolatile compound such as pentachlorophenol (PCP).

The extraction was made from a 5 µg/L PCP contaminated water sample contained in a 500 ml glass bottle. The water pH was adjusted to pH=3 to decrease the solubility of PCP in water. A 45" length of Teflon tape and 2 ml octane were added to the water. The glass bottle containing the water, Teflon tape and octane was shaken manually for 5 minutes. The Teflon tape was removed from the water and placed in a glass vial with 3.7 mL clean octane. The contaminate was then separated from the Teflon tape with a pipette tip pressed against the tape at the bottom of the vial. The clear octane/PCP solution remaining over the tape was transferred to a third glass vial which contained 0.05 g sodium sulfate as a drying agent. The clear octane/PCP solution was then pipetted to another vial containing 1.2 mL acetonitrile. The octane and acetonitrile solution were shaken for 1.5 minutes to extract the PCP from the octane solution into the acetonitrile solvent. The immiscible solvents were allowed to separate while standing still. A pipette was used to transfer 0.60 mL acetonitrile/PCP into a 1.6 mL glass reaction vial which contained 0.2 mL 2.36 mM benzo(a)pyrene and 0.20 mL 3.75 mM Leuco Crystal Violet in 4-methyl-2-pentanone.

The photochemically reactive solution in the reaction vial was then exposed to ultraviolet (UV) light (black Ray xx-15L, UVP, Inc.) For a period of 5 minutes at a distance of 6 cm. The previously uncolored, clear solution was turned a deep blue after UV light exposure. The amount of coloration produced was determined in an UV-visible spectrophotometer (Hewlett Packard, model 8452A). An absorbance contrast of 0.50 was obtained between the 5 µg/L PCP water sample and a control sample (without PCP) when measured at the peak wavelength of 588 nm. This example illustrates the extraction method can be used in a highly sensitive analytical procedure for a semivolatile compound such as PCP.

EXAMPLE 4

In another example, the Teflon substrate extraction method was used on the semivolatile compound benzo(a)pyrene (BaP). The extraction was performed on a water sample containing 20 µg/L BaP. A 45" length of Teflon tape and 2 mL octane were added to the 500 mL water sample in a 500 mL glass bottle. The glass bottle was shaken manually for 5 minutes. The Teflon tape was removed from the water and placed in a 3.7 mL glass vial. As in the previous example, the octane/BaP was separated from the Teflon tape by holding a pipette tip pressed against the tape at the bottom of the vial while the fresh octane was removed. The clear octane/BaP solution remaining over the tape was transferred to a 3.7 mL glass vial which contained 0.05 g sodium sulfate as a drying agent. A pipette was used to transfer 0.40 mL octane/BaP into a 1.6 mL glass reaction vial which contained 0.4 mL 2.71 mM carbon tetrabromide and 0.20 mL 3.75 mM Leuco Crystal Violet in 4-methyl-2-pentanone.

As in the previous example, the photochemically reactive solution in the reaction vial was then exposed to UV light (Black Ray xx-15L, UVP, Inc.) for a period of 5 minutes at a distance of 6 cm. The previously uncolored, clear solution was turned a deep blue after UV light exposure. The amount of coloration produced was determined in an UV-visible Spectrophotometer (Hewlett Packard, model 8452A). An absorbance contrast of 0.18 was obtained between the 20 µg/L BaP water sample and a control sample (without BaP) when measured at the peak wavelength of 588 nm. This example illustrates the extraction method can be used in a sensitive analytical procedure for a semivolatile compound with as benzo(a)pyrene.

Although the previous examples demonstrate a preferred embodiment of the invention using TEFLON™ brand of polytetrafluoroethylene ribbon tape, this invention is not limited to the use of a particular brand or type of ribbon tape. Indeed most any tape can be used so long as the tape selected is hydrophobic and allows for the facile formation of a hydrophobic film on the surface of the used ribbon tape.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for extracting organic contaminants from an aqueous sample comprising:
    (a) mixing a non-polar polymer and an organic non-polar solvent with the aqueous sample to form a mixture such that the non-polar polymer, organic non-polar solvent, and aqueous sample are in intimate contact with each other;
    (b) incubating the mixture for a sufficient period of time for the organic contaminants and the organic non-polar solvent to adhere to the non-polar polymer; and
    (c) then removing the non-polar polymer with the organic contaminants and the organic non-polar solvent adhering thereto from the mixture.

2. The method of claim 1 wherein said non-polar polymer is polytetrafluoroethylene.

3. The method of claim 1 wherein said non-polar polymer has a geometric shape.

4. The method of claim 3 wherein said non-polar polymer is rectangular.

5. The method of claim 4 wherein said non-polar polymer is a ribbon tape.

6. The method of claim 1 wherein said non-polar polymer has a nongeometric shape.

7. The method of claim 1 wherein said organic non-polar solvent is octane.

8. The method of claim 1 further comprising removing said organic contaminants and said organic non-polar solvent from said non-polar polymer.

9. The method of claim 8 further comprising drying said organic contaminants and said organic non-polar solvent removed from said non-polar polymer.

10. The method of claim 1 wherein the mixing comprises agitating the mixture.

* * * * *